United States Patent [19]
Uno et al.

[11] 3,959,771
[45] May 25, 1976

[54] PATTERN RECOGNITION APPARATUS

[75] Inventors: Takeshi Uno, Sayama; Sadahiro Ikeda, Hachioji; Masakazu Ejiri, Tokorozawa; Jun Motoike, Hachioji, all of Japan

[73] Assignee: Hitachi, Ltd., Japan

[22] Filed: Oct. 11, 1973

[21] Appl. No.: 405,257

[30] Foreign Application Priority Data
Dec. 8, 1972 Japan.............................. 47-122508
Oct. 13, 1972 Japan.............................. 47-101882

[52] U.S. Cl................... 340/146.3 H; 340/146.3 Y
[51] Int. Cl.²........................................... G06K 9/04
[58] Field of Search........... 340/146.3 Q, 146.3 AQ, 340/146.3 MA, 146.3 S, 146.3 AG, 146.3 H

[56] References Cited
UNITED STATES PATENTS

| | | |
|---|---|---|
| 3,192,505 | 6/1965 | Rosenblatt................ 340/146.3 AG |
| 3,196,396 | 7/1965 | Reines........................ 340/146.3 Q |
| 3,237,161 | 2/1966 | Rabinow.................... 340/146.3 MA |
| 3,295,103 | 12/1966 | Driese........................ 340/146.3 AQ |
| 3,400,368 | 9/1968 | Le May...................... 340/146.3 AG |
| 3,492,647 | 1/1970 | Otten et al................. 340/146.3 R |
| 3,521,236 | 7/1970 | Parks......................... 340/146.3 Q |
| 3,597,731 | 8/1971 | Reitboeck et al.......... 340/146.3 H |
| 3,701,095 | 10/1972 | Yamaguchi et al. ..... 340/146.3 MA |

*Primary Examiner*—Leo H. Boudreau
*Attorney, Agent, or Firm*—Craig & Antonelli

[57] ABSTRACT

A pattern recognition apparatus for discriminating a body having a specified shape from a number of bodies, in which an image area, at which the image signal has a value within a specified range, within a specified region of the image of a body is measured and whether or not the image area is within the range predetermined by the body to be recognized is decided.

4 Claims, 42 Drawing Figures

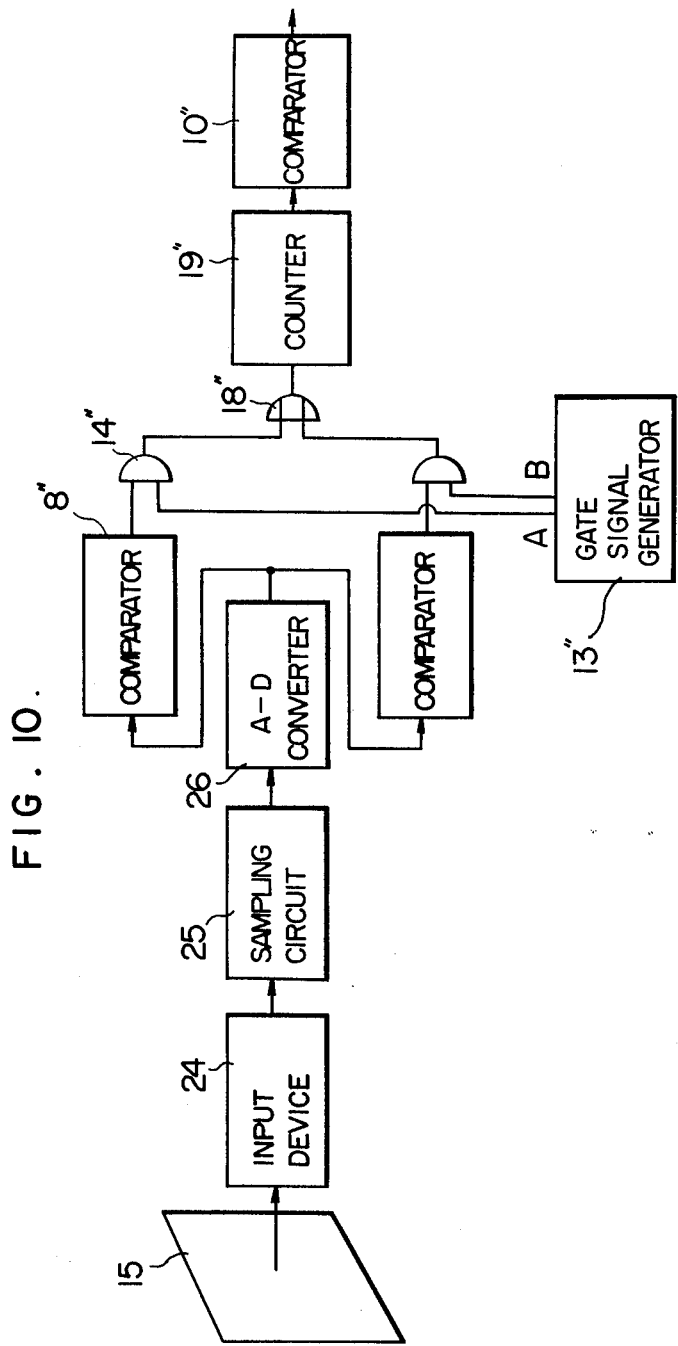

FIG. 11a   FIG. 11b   FIG. 11c
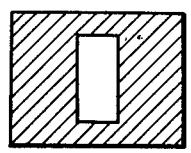 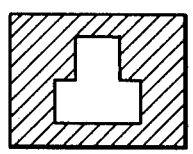 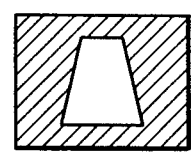
FIG. 12a   FIG. 12b   FIG. 12c
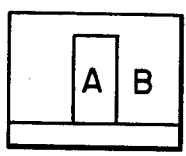 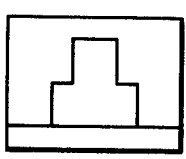 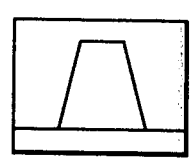
FIG. 19a   FIG. 19b   FIG. 19c
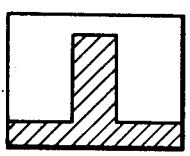 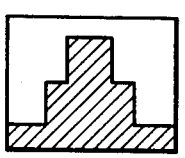 

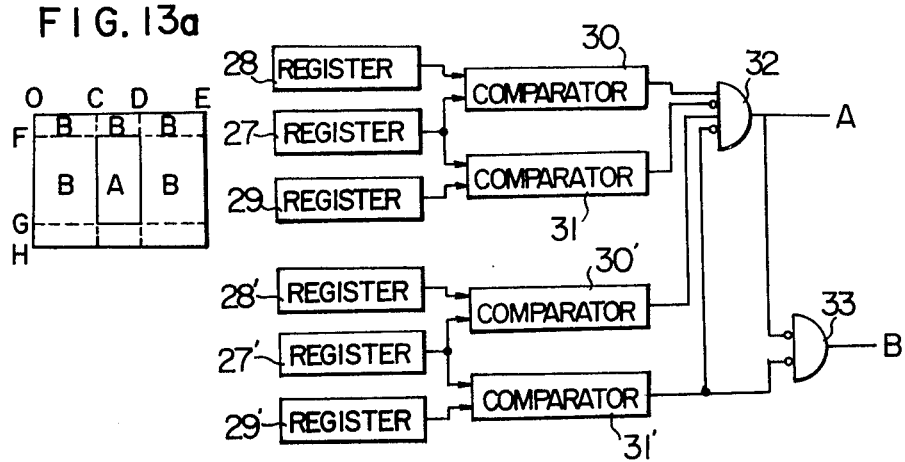
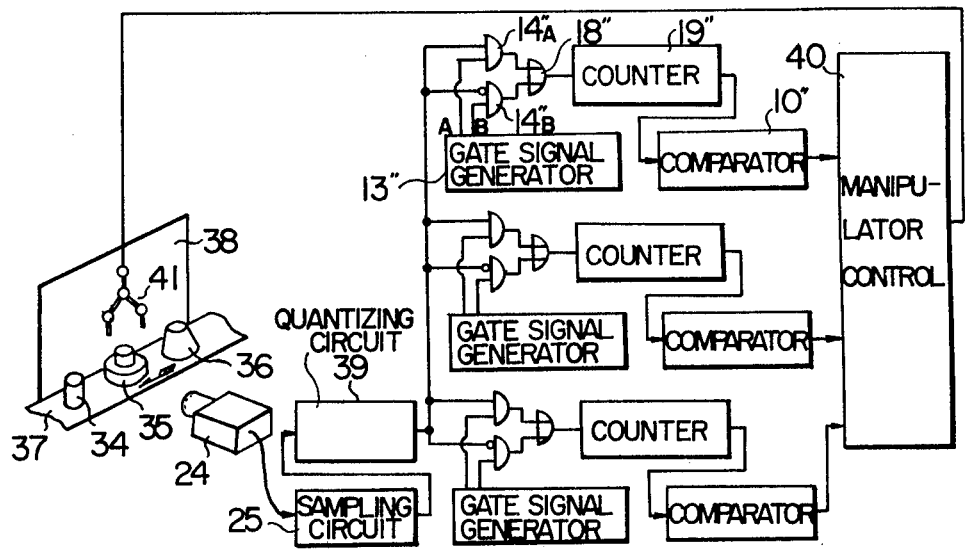

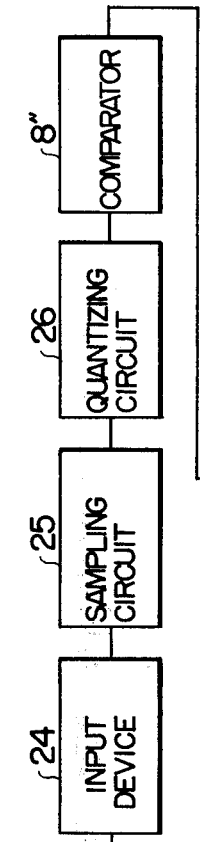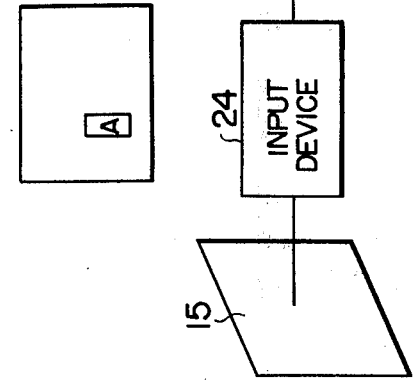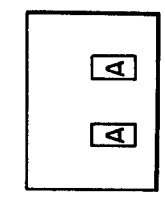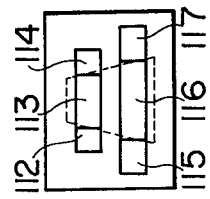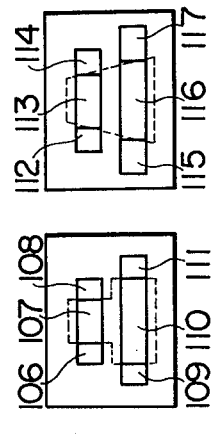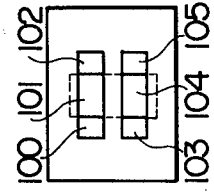

A B C D $a-b+c-d$

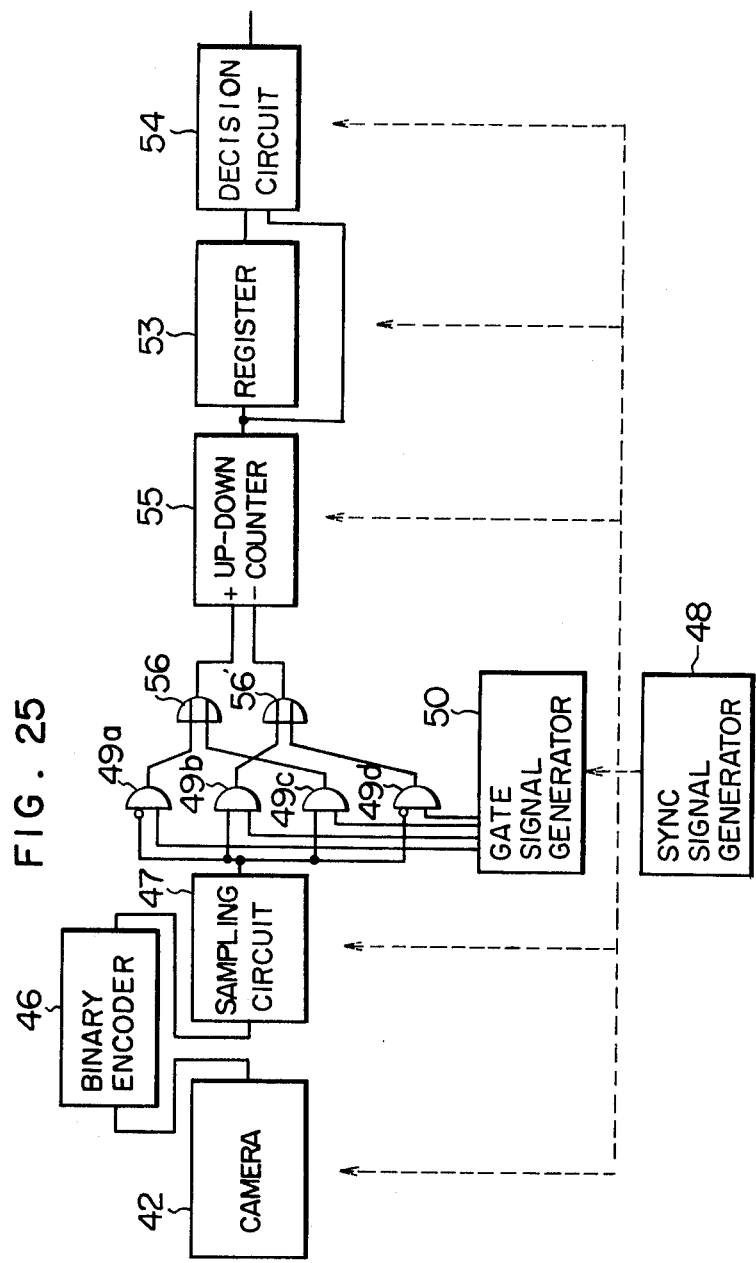

PATTERN RECOGNITION APPARATUS

The present invention relates to an apparatus for determining the position of the specified part of a pictured or picked up object from the image information thereof.

It was common to conventional pattern recognition apparatuses to utilize a digital electronic computer having a high degree of capability to treat a huge amount of pattern information and to perform complicated processing. Moreover, since these apparatuses have to be of the high speed type for processing a great amount of quantity and require a memory of large capacity for a large amount of pattern information, they are necessarily expensive.

An object of the present invention is to provide a pattern recognition apparatus not requiring these expensive instruments.

According to one aspect of the present invention there is provided a pattern recognition apparatus comprising first means for inputting an image of an object, second means for measuring an image area, at which the image signal has a value within a specified range, within at least one specified region of the image, and third means for deciding whether or not the image area is within the range predetermined by the object to be recognized.

According to another aspect of the present invention there is provided a pattern recognition apparatus comprising first means for inputting an image of an object, second means for measuring an image area, at which the image signal has a value within a specified range, within each of four specified regions arranged in one direction, third means for performing sucessively first and second arithmetic operations between measured areas of the four specified regions, fourth means for deciding whether or not the image area resulted from the first arithmetic operation is within a range predetermined by the object to be recognized, and fifth means for determining the position of the object from the time variation in the result of the second arithmetic operation.

The fundamental principle of the present invention is that the amount of space, at which the pattern value is within a specified range, within a specified region of the space of a pattern is measured and whether or not the amount of space is within a predetermined range is decided. The elements required for this apparatus are mainly comparators and integrators or adders all of which are easily obtainable and inexpensive so that the apparatus is easily realizable and is inexpensive in constructing into a high speed one.

When a plurality of the above-described structures are utilized in parallel and the results obtained therefrom are subjected to operations such as logical operations, arithmetic operations, etc., more complicated patterns can be processed and the likelihood of recognition can be improved.

Incidentally, for the sake of convenience to catch practical concepts terms for a general pattern will be contrasted below with terms for an image such as obtained by a television image input device:

| Terms for general pattern | Terms for image |
|---|---|
| Pattern | Image (information) |
| Pattern recognition | Recognition of image information |
| Pattern space | Image plane |
| Amount of (pattern) space | Area of image plane |
| Value of pattern | Value of image (Information concerning brightness or luminance) |

For a better understanding of the present invention the preferred embodiments of the present invention will be described with reference to the accompanying drawings, in which:

FIG. 10 is a block diagram of another embodiment of the present invention;

FIGS. 11a to 12c are diagrams for explaining the operation of the embodiment of FIG. 10;

FIG. 13a is a diagram for explaining the operation of a part of the embodiment of FIG. 10;

FIG. 13b is a block diagram of the circuit for the operation of FIG. 13a;

FIGS. 14a to 14c are another embodiment of the present invention and the operations thereof;

FIGS. 16a to 16c are diagrams for explaining the operation of the embodiment of FIG. 15;

FIG. 18 is a block diagram of an automatic working machine to which the present invention is applied;

FIGS. 19a to 19c are diagrams for explaining the operation of the machine of FIG. 18; and FIGS. 20 to 26b are still further embodiments of the present invention and explanations thereof.

Figure 1:
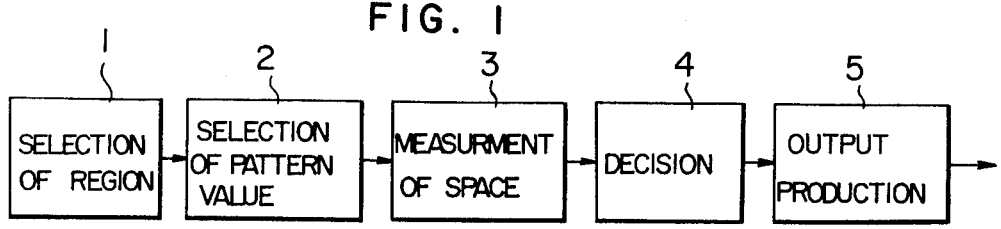
FIG. 1 is a schematic construction diagram of the pattern recognition apparatus according to the present invention.

The fundamental processing function of the apparatus of the present invention is shown in FIG. 1, in which reference numeral 1 designates a section to decide or select a specified region of a pattern space, reference numeral 2 designates a section to decide or select a specified range of the value of a pattern, reference numeral 3 designates a section to measure the amount of the space of that part of the pattern space which satisfies the decision conditions of sections 1 and 2, reference numeral 4 designates a section to decide whether the amount of space obtained by the section 3 is in a predetermined range or not, and reference numeral 5 designates a section to produce a final result of recognition by logically or arithmetically operating the result of the section 4.

Here, it is to be noted that FIG. 1 merely shows the fundamental processing function of the apparatus of the present invention and not the actual flow or transfer route of information. Thus, for example, the sections 1 and 2 may be exchanged, and a part or the whole of the section 5 may be transferred to the position before the section 3 to simplify the structure of the apparatus. Alternatively, it is common that the structure of the apparatus is complicated by arranging some functions in parallel.

Examples of the fundamental construction of the apparatus of FIG. 1 will next be described.

Figure 2:
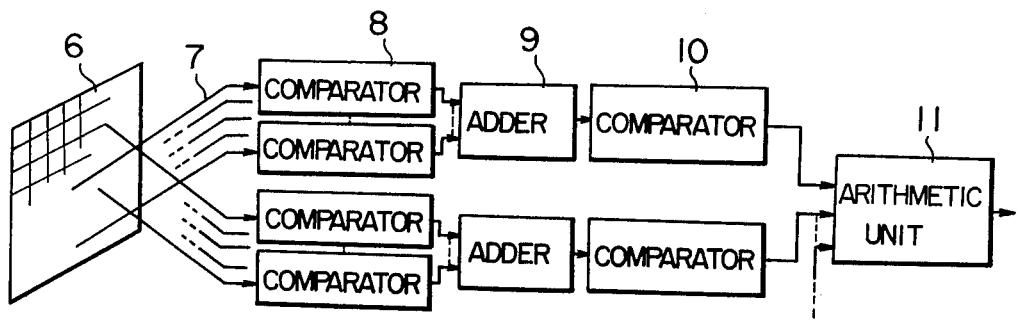
FIGS. 2 to 4 are block diagrams of embodiments of the apparatus of FIG. 1.

FIG. 2 is an example for a discrete pattern as an object, in which reference numeral 6 designates a memory board of an object pattern, reference numeral 7 designates pattern value reading wires, reference numeral 8 designates pattern value comparators, reference numeral 9 designates adders, reference numeral 10 designates comparators for the adders 9, and reference numeral 11 designates an arithmetic unit. The sequence of processing of this example is in agreement with that of FIG. 1. The read wires 7 realize the function of the section 1 in FIG. 1 by selecting the connection. The comparators 8 produce a binary signal "1" when the pattern value is within a specified range and correspond to the section 2 in FIG. 1. The adders 9 which add the outputs of the comparators 8 correspond to the section 3 in FIG. 1. The comparators 10 which produce a binary signal "1", for example, when the measured amount of space is within a specified range correspond to the section 4 in FIG. 1. The arithmetic unit 11 which operates on a number of state outputs of the comparators 10 to decide whether or not the object pattern is a specified pattern corresponds to the section 5 in FIG. 1.

Here, it is to be noted that the word "specified" can be rewritten as "set". Of course, this setting may be made at the time of selection of the apparatus, may be made temporarily by a variable element, or may be made by an additional circuit or device. Such a setting in some sense may be made by the part 7, 8, 10, or 11 such that conditions concerning the pattern to be recognized are given.

The arrangement of FIG. 2 has the recognizing function only for one kind of pattern. Consequently, to have the recognizing function for plural kinds of patterns either the conditions concerning the patterns to be recognized are successively varied or the circuit parts 7 to 11 are arranged in parallel in the same number as that of the kinds of the patterns. Of course some of these circuit parts may be used in common.

When the pattern values are to be treated discretely, additional elements such as analog-to-digital converters may be necessary. However, those elements which are not essential to the present invention are omitted. The same is true of the following examples, too.

Figure 3:
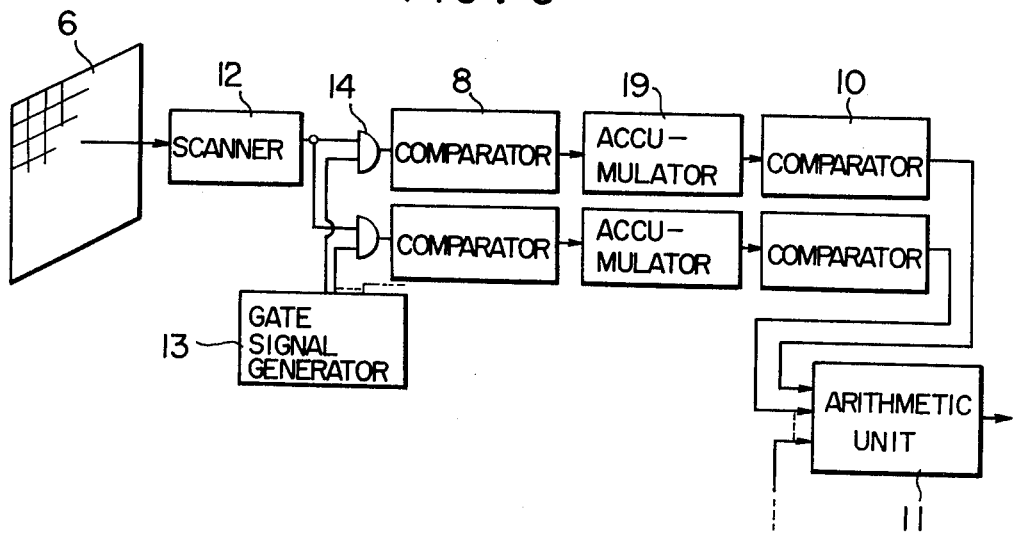

FIG. 3 shows an example of the arrangement capable of scanning the pattern space, in which reference numeral 12 designates a scanner to scan the pattern space 6 to pick up successively the pattern values at various parts of the pattern space 6, reference numeral 13 designates a pattern space gate signal generator to produce an output 1 while the scanner 12 is scanning the specified region of the pattern space 6, reference numeral 14 designates gate circuits to pass the output of the scanner 12 therethrough to the comparators 8 only when the output of the gate signal generator 13 is the binary signal 1, and reference numeral 19 designates accumulators to accumulate the number of the outputs 1 from the comparators 8. Since the value accumulated by the accumulator 19 does not generally have meaning until the scanning of the entire pattern space (hereinafter referred to as field scanning) is completed, it is necessary to establish such that the comparators 10 and the arithmetic unit 11 are operated at that time. The accumulator 19 has to be made having been reset at the start of the field scanning.

Even if the sequence of the gate circuits 14 and the comparators 8 is exchanged in the arrangement of FIG. 3, the same operation and result are provided. (An example is shown in FIG. 4) The same is true of the arrangement of FIG. 2, too.

Figure 4:
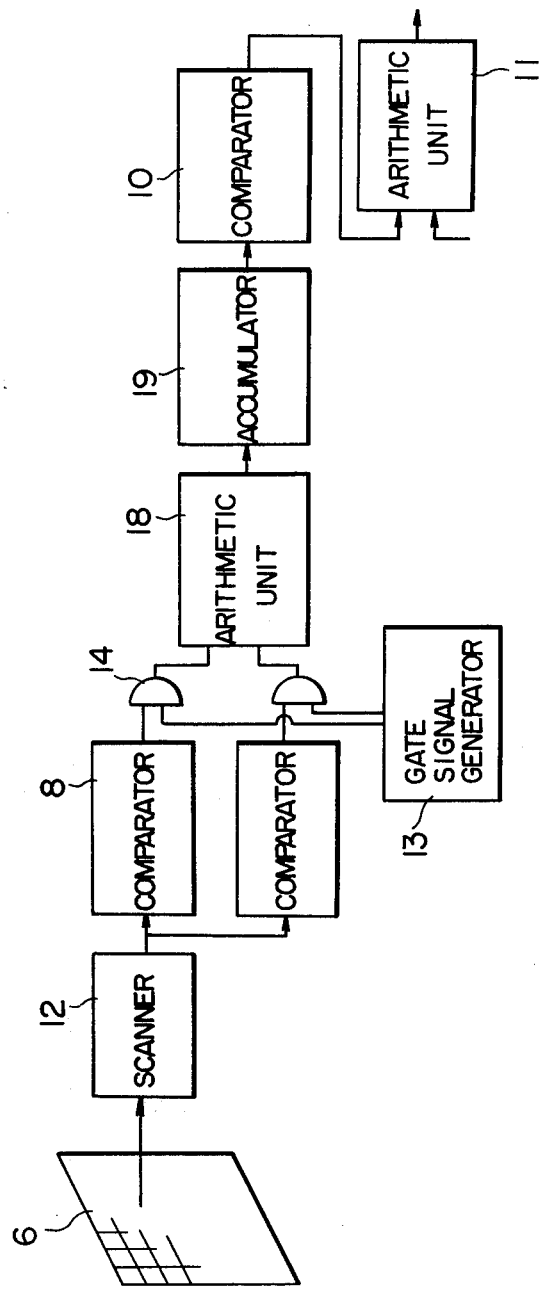

FIG. 4 shows a similar arrangement to that of FIG. 3 except that the gate circuits 14 and the comparators 8 are exchanged and another arithmetic unit 18 is provided additionally before the accumulator 19. The operation of the arrangement of FIG. 4 is not so different from that of the arrangement of FIG. 3 that the description thereof is omitted.

Next, more practical embodiments of the present invention will be described in more detail.

Figure 5:
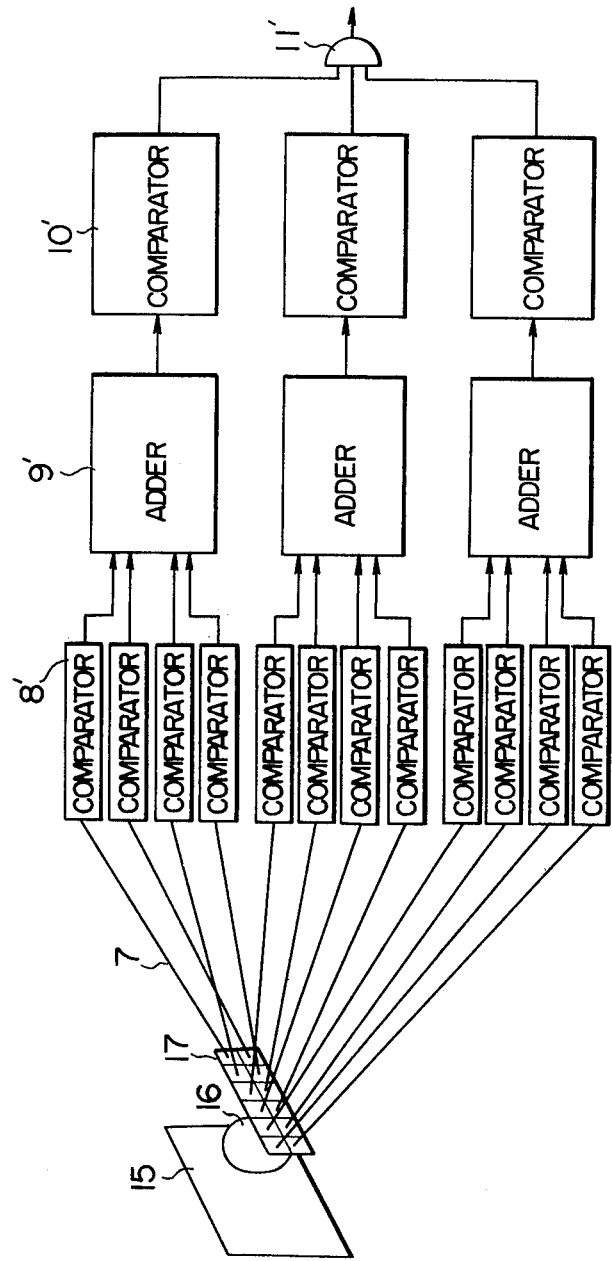
FIG. 5 is a block diagram of an embodiment of the present invention.
Figure 6:
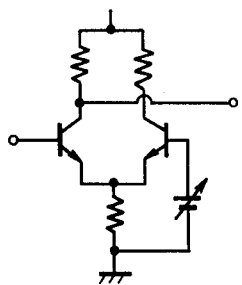
FIGS. 6 to 8 are practical circuit diagrams of various parts of the embodiment of FIG. 5.
Figure 7:
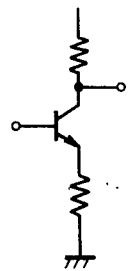

FIG. 5 shows an example of the construction of FIG. 2 having an object of recognition of a pattern of brightness or luminance (including a brightness or luminance pattern such as formed of a body. The same is true of the following embodiments, too). Reference numeral 15 designates an object pattern formed of brightness or luminance and reference numeral 16 designates an optical lens. Reference numeral 17 designates an array of photoelectric elements, for example a two-dimensional array of photo-diodes. The output part of the array of the photoelectric elements 17 may be regarded as one having the same effect as the pattern space or the memory board of the object pattern 6 in FIG. 2. Reference numeral 11' designates an AND circuit which corresponds to the arithmetic unit 11 in FIGS. 2 to 4. Reference numerals 8' and 10' designates analog comparators the circuit of which is as shown in FIG. 6. This analog comparator produces an output signal of either one of two states 1 and "0" for a continuous input signal. The threshold value thereof is determined by a variable power source. To invert the state of the output signal the use of an ordinary amplifier as shown in FIG. 7 is sufficient. For example, such a comparator as produces an output of binary 1 when the input signal is between certain upper and lower limits and produces an output of binary 0 when the input signal is outside that range can be made easily by combining such a circuit as shown in FIG. 7 and a logical element.

Figure 8:
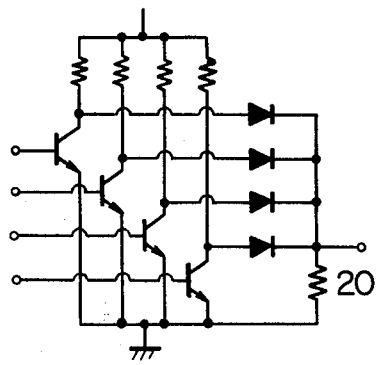

Reference numeral 9' designates an adder circuit which receives the output signals of four comparators 8' to produce an electric quantity proportional to the number of the input signals having the state 1. The actual structure of the adder circuit 9' is as shown in FIG. 8 in which four transistors ones provided with a high input voltage become conducting to produce a voltage proportional to the number of the conducting transistors across a resistor 20 as an output voltage. The comparator 10' compares this output voltage with a set voltage and produces an output of a binary 1 if the output voltage is within the set range.

In this manner the sections 6, 7, 8, 9, 10, and 11 in FIG. 2 can be practised as the parts 17, 7, 8', 9', 10' and 11' in FIG. 5.

Figure 9:
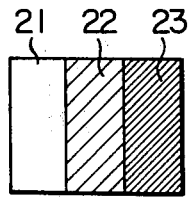
FIG. 9 is a diagram for explaining the operation of the embodiment of FIG. 5.

The operation of the arrangement of FIG. 5 will now be described. Consider the case that when the object to be recognized 15 is a brightness pattern as shown in FIG. 9, the output of the AND circuit 11' is a binary 1 and otherwise a binary 0. In FIG. 9 a darker part is more densely hatched. If it is assumed that the output of the photoelectric converter 17 is 0.9 – 1.0 V for the part 21 of the object pattern 15 shown in FIG. 9, 0.5 – 0.6 V for the part 22, and 0.0 – 0.1 V for the part 23, the analog comparators 8' are set such that the part 23, the analog comparators 8' are set such that the part (upper four) thereof corresponding to the area 21 outputs a binary 1 (high voltage) for the input 0.9 – 1.0 V, the part (central four) corresponding to the area 22 outputs a binary 1 for the input 0.5 – 0.6 V, the part (lower four) corresponding to the area 23 outputs a binary 1 for the input 0.0 – 0.1 V, and the analog comparators 8' output a binary 0 (0 V) for other input voltages.

Each of the adder circuits 9' is constructed such that when $n$ of the four analog comparators 8' connected thereto produce a binary 1, it produces $n/4$ V. If each of the analog comparators 10' is set such that it produces a binary 1 when the output of the circuit 9' is 0.6 V or more, for example, it produces a binary 1 when three or more of the four analog comparators 8' produce a binary 1. If it is desired that the comparator 10' produces a 1 when all of the four comparators 8' produce a 1, it is sufficient to establish such that the comparator 10' produces a 1 when the output of the adder circuit 9' is 0.9 V, for example.

Thus, the set voltage of the comparator 10' depends upon to what degree the variation in the brightness and the distortion of the configuration of the brightness pattern 15 are allowed. Consequently, the larger the allowability is, the system more immune to noise results. However, if the allowability is made too large, the comparator 10' becomes to produce a binary 1 even to a different brightness pattern to provide an erroneous result.

The same is true of the selection of the set voltage of the analog comparators 8'. Although, in the above example, the photoelectrically converted output for an ideal object is used as the set value as it is, the setting may be made taking the stain of the object, the variation in the illumination on the object, etc. into consideration.

The setting condition of the analog comparators 8' and that of the analog comparators 10' have interrelation to a certain degree, for example, if the setting condition of the comparators 8' is stringent, it is better to loosen that of the comparators 10', while if the setting condition of the comparators 8' is loose, it is better to make the setting condition of the comparators 10' stringent.

If the setting of the comparators 8' and 10' is made in the above manner and if the object 15 has the pattern as shown in FIG. 9, the outputs of the three analog comparators 10' are all a binary 1 and the output of the AND circuit 11' is also a binary 1. When a pattern different from that in FIG. 9 in the degree of the brightness and in the configuration is selected as the object 15, the degree of the brightness does not meet the condition for the comparators 8', the difference in the configuration does not meet the condition for the setting element 7 of a specified region of the pattern space, and, as a result, the condition for the comparators 10' is not satisfied, resulting in the output 0 of the AND circuit 11'. Thus, it can be said that the output of the AND circuit 11' is the recognized output for the pattern of FIG. 9.

If it is necessary to recognize patterns other than that of FIG. 9, all that has to be done is to provide the circuits corresponding to the circuit parts 7, 8', 9', 10', and 11' in the number of the patterns wished to recognize.

Of course it is needless to say that the read wires 7 are to be arranged in conformity with the configuration of each pattern, the analog comparators 8' are to be set in conformity with the degree of the brightness, and the analog comparators 10' are to be set in conformity with the variation in the configuration and the degree of the brightness.

FIG. 10 shows an example of the construction of FIG. 4. This example also has a brightness pattern as the object to be recognized similarly to the example of FIG. 5. Reference numeral 15 designates an object pattern composed of brightness, reference numeral 24 designates a television image input device, and reference numeral 25 designates a circuit for sampling an electric signal supplied continuously in time from the input device 24. By this sampling the image is made discrete in the horizontal direction. Reference numeral 26 designates an analog-to-digital converter for making the value of the continuous image signal held temporarily by the sampling circuit 25.

Reference numeral 8" designates digital comparators to produce an output of a binary 1 when the value of the image signal is within the set range. Reference numeral 14" designates AND gates which are gated by the space gate signal A or B supplied from a space gate signal generator 13".

Reference numeral 18" designates an OR gate which supplies the outputs of the two gate circuits 14" (When it is necessary to distinguish one from the other, the name of the space gate signal A or B is suffixed to them. The same is true of the following description, too.) to a counter 19" which counts the number of the pulses supplied from the OR gate 18". Reference numeral 10" designates a digital comparator which produces an output of a binary 1 when the count of the digital counter 19" is within the set range.

A detailed structure and the operation of this circuit will next be described.

It is assumed that the object pattern is the three brightness patterns shown in FIGS. 11$a$ to 11$c$, in which the hatched portions are black and the remaining portions are white. All that has to be done to discriminate (recognize) these patterns is to utilize the space gate signals shown in FIGS. 12$a$ to 12$c$, respectively, for example, in which the part denoted by the letter A is that part in which the space gate signal A is a binary 1 and the remaining part is that part in which the space gate signal A is a binary 0. While scanning the object pattern, the state corresponding to the scanning point is outputted as a space gate signal.

The space gate signal and the circuit for generating it will be described referring to FIGS. 13$a$ and 13$b$. FIG. 13$a$ is a state diagram of the same space gate signal as that of FIG. 12$a$. It is assumed that when the state of a point in the object pattern is being inputted or scanned by, for example, the television image input device 24 in FIG. 10, the space gate signal at that time takes the state of the point at the same position on the space gate signal diagram, for example that of FIG. 13$a$. For example, if the scanning point is in the space region denoted by A in FIG. 13$a$, the space gate signal generator 13" produces a binary 1 at its output terminal A, while if the scanning point is in the space region other than that denoted by A, a binary 0 is produced at the output terminal A. This signal is a one called a space gate signal A.

To produce the space gate signals A and B it is sufficient to employ the circuit shown in FIG. 13$b$, for example, in which reference numerals 27 and 27' designate counters for counting the pulses proportional to the velocities in the horizontal and vertical directions of the respective scanning points. It is sufficient for the counters 27 and 27' to use the sampling pulse used for the sampling circuit 25 in FIG. 10 and the horizontal synchronizing signal for scanning, respectively. Though not clearly shown in FIG. 13b, the counter 27 is made to be reset every time the horizontal scanning starts, while the counter 27' is made to be reset every time the vertical scanning starts.

Reference numerals 28 and 29 designate registers for registering set values, and reference numerals 30 and 31 designate comparator circuits producing an output of a binary 1 when the upper input value (coded digital value: the same is true of the following description, too) is lower than the lower input value.

If it is assumed that the horizontal scanning is made in a direction of O, C, D, and E in FIG. 13a, the registers 28 and 29 are set with the pulse numbers corresponding to the C and D points, respectively. Then, when the left-hand side of the point C is being scanned, the outputs of the comparators 30 and 31 are both a binary 0, while on the right-hand side of the C point the output of the comparator 30 is a binary 1 and on the right-hand side of the D point the output of the comparator 31 is a binary 1.

The functions of registers 28' and 29' and comparator circuits 39' and 31' are the same as those of the registers 28 and 29 and the comparator circuits 30 and 31, respectively. If it is assumed that the vertical scanning is made in a direction of O, F, G, and H in FIG. 13a, the registers 28' and 29' are set with the pulse numbers corresponding to the F and G points, respectively. Then, when the upper side of the F point is being scanned, the outputs of the comparator circuits 39' and 31' are both a binary 0, while on the lower side of the F point the output of the comparator 30' is a binary 1 and on the lower side of the point G the output of the comparator 31' is a binary 1.

Reference numerals 32 and 33 designate AND circuits (small circle on the input indicates negation). In the connection shown the AND gate produces an output of a binary 1 when the scanning point is between the points C and D in a horizontal direction and between the points F and G in a vertical direction, while the AND gate 33 produces an output of a binary 1 when the scanning point is above the point G in a vertical direction and the output of the AND circuit 32 is a binary 0. Consequently, the AND gate 32 produces the space gate signal A and the AND gate 33 produces the space gate signal B.

The space gate signal of FIG. 12b can be realized by somewhat complicating the above-described procedure. The space gate signal of FIG. 12c can be realized by gradually decreasing and increasing the contents of the registers 28 and 29, respectively, in FIG. 13b. It can be seen from the above description that a space gate signal generator can be easily realized.

It is assumed that when the arrangement of FIG. 10 scans the central white part of the pattern of FIG. 11a, the output of the analog-to-digital converter 26 is numerical values (that is, the level of brightness) of from 10 to 15, for example, while when it scans the peripheral black part, the output of the converter 26 is numerical values of from 0 to 4. The output of the converter 26 is supplied to the two comparators 8'', one of which is denoted by 8''$_A$ and the other of which is denoted by 8''$_B$. The comparator 8''$_A$ is made to produce an output of a binary 1 when it is supplied with an input of a numerical value of from 9 to 15, while the comparator 8''$_B$ is made to produce an output of a binary 1 when it is supplied with an input of a numerical value of from 0 to 6. The output of the comparator 8''$_A$ is connected to the gate circuit 14''$_A$ which is open at the region A in FIG. 12a, while the output of the comparator 8''$_B$ is connected to the gate circuit 14''$_B$ which is open at the region B in FIG. 12a.

Then, when the pattern of FIG. 11a is the object pattern and the field scanning thereof is completed, the counter 19'', which counts the number of times the gate circuit 18'' outputs a binary 1, counts the numerical value corresponding to the area of the sum of the region A and the region B in FIG. 12a. When the pattern of FIG. 11b or 11c is selected as the object pattern, the count thereof is to be less than the above count.

If the comparator 10'' is constructed such that it produces an output of a binary 1 when it is supplied with an input of a numerical value approximating the numerical value corresponding to the area of the sum of the regions A and B in FIG. 12a, its output represents the result of the recognition of the pattern of FIG. 11a.

If the setting condition is made contrary to the above one, that is, if the comparator 8''$_A$ is made to produce an output of a binary when it is supplied with an input of a numerical value of from 0 to 6, while the comparator 8''$_A$ is made to produce an output of a binary 1 when it is supplied with an input of a numerical value of from 9 to 15, the count of the counter 19'' is 0 when the object is the pattern of FIG. 11a and is a larger value when the object is a pattern other than that of FIG. 11a. Consequently, if the comparator 10'' is constructed such that it produces an output of a binary 1 when it is supplied with the count approximating 0, its output also represents the result of the recognition of the pattern of FIG. 11a.

Either of these two methods will do.

If it is desired to discriminate or recognize which of the patterns of FIGS. 11a to 11c the object pattern is by one scanning of the object pattern, it is sufficient to provide three sets of the digital comparators 8'' and the subsequent stages of circuits and to give suitable conditions to the comparators 8'' and 10'' and the gate signal generator 13'' of each set. Alternatively, it may be that maintaining the circuit of FIG. 10 as it is, the space gate signals are successively changed so that they correspond to the patterns of FIGS. 11a to 11c, for example like those of FIGS. 12a to 12c, respectively, at each entire scanning of each pattern, and at the same time also the setting conditions of the comparators 8'' and 10'' are likewise changed.

Incidentally, a method of recognizing the existance and position of an arbitrarily specified configuration contained in the pattern by utilizing this system will be described. In actual pattern recognition an object pattern can in some cases be positionally in complete agreement with the set condition or pattern (in some cases called a standard pattern), but often this cannot be done. Then, by shifting the entire object pattern or the set position concerning the pattern space the specified configuration, i.e. the specified part of the pattern can be recognized even for the pattern which is positionally not in agreement. In this case, if the displacement of the entire pattern or the set position has been made known, also the position of the specified part of the pattern can be recognized.

For example, in the example of FIG. 5 which can always provide a recognized output, if a recognized output can be provided while displacing the entire pattern or the optical field of the arrangement, the position of the part concerned of the object pattern can be known from the position of the optical axis at that time.

The example of FIG. 10 is a form which provides an output each time the scanning of the entire pattern space is completed, so that some consideration is necessary for the shifting method or so. To attain this purpose by changing the setting condition it is sufficient to gradually increase or decrease the contents of the registers 28, 29, 28′, and 29′ in FIG. 13b at each entire scanning or to gradually increase or decrease at each entire scanning the contents of the counters 27 and 27′ (not restricting to make zero) at the time of resetting them. These methods merely perform translation. If rotation is necessary, all that is to be done is to perform the above-described gradual increase or decrease at each horizontal scanning and not at each entire scanning. In some cases the combination of these shifting methods provides a better result.

In FIGS. 12a to 12c the specified region of the pattern space is indicated by the regions A and B. However, the specified region is not necessarily of two kinds. A number of regions of one kind can be scattered discretely. Also, there can be any part which belongs to no specified region of the pattern space as shown in FIGS. 12a to 12c, or contrary thereto all parts of the pattern space can belong to any specified region. This situation will be described below citing examples.

First, an example of a specified region of one kind is shown in FIG. 14a. This is on the supposition that the object pattern is limited to the three kinds of patterns of FIGS. 11a to 11c. The amount of space belonging to both region A and black of each object pattern is 100 % of the amount of space of the region A of FIG. 11a, 0 % of that of FIG. 11b, and 25% of that of FIG. 11c. Consequently, the three kinds of patterns can be discriminated by the circuit as shown in FIG. 14b. That is, if it has been made such that when the space gate signal generator 13″ is constructed to generate the space gate signal of FIG. 14a and when the values of the amount of space measured by the counter 19″ are about 100 %, 0 %, and 25 %, respectively, of the amount of space of the region A, the output of each of digital comparators $10''_a$, $10''_b$ and $10''_c$ is a binary 1, they can be treated as the recognized output of the patterns of FIGS. 11a to 11c, respectively.

The case in which there are three kinds of specified regions is omitted because it has already been described referring to FIGS. 5 and 9.

An example of a number of discrete independent regions of one kind is shown in FIG. 14c. Even if such specified regions of space are used, a similar result can be obtained by the circuit of FIG. 14b.

FIGS. 16a to 16c are examples of the space gate signal corresponding to FIGS. 11a to 11c. If these space gate signals are utilized, the white part and the background black part of the object patterns of FIGS. 11a to 11c become the object of recognition processing. Consequently, a result of a higher likelihood is obtained then utilizing the space gate signal of FIG. 14a or 14c. Moreover, according to this metod generation of the space gate signal is easy, and also be increasing the number of the space gate signals the recognition of a more complicated configuration is possible.

This method will next be described in some detail. It is assumed that in FIGS. 16a to 16c the part 101 is the space region $A_1$, the parts 100 and 102 are the regions $B_1$, the part 104 is the region $A_2$, the parts 103 and 105 are the regions $B_2$, the part 107 is the region $A_3$, the parts 106 and 108 are the regions $B_3$, the part 110 is the region $A_4$, the parts 109 and 111 are the regions $B_4$, the part 113 is the region $A_5$, the parts 112 and 114 are the regions $B_5$, the part 116 is the region $A_6$, and the parts 115 and 117 are the regions $B_6$. Also it is assumed that when the space gate signal generator is employed (FIGS. 4, 10, and 14b) the space gate signal generated by it is designated by the same notation as the above region. The dotted lines in FIGS. 16a to 16c indicate the profiles of the patterns of FIGS. 11a to 11c, respectively.

Figure 15:
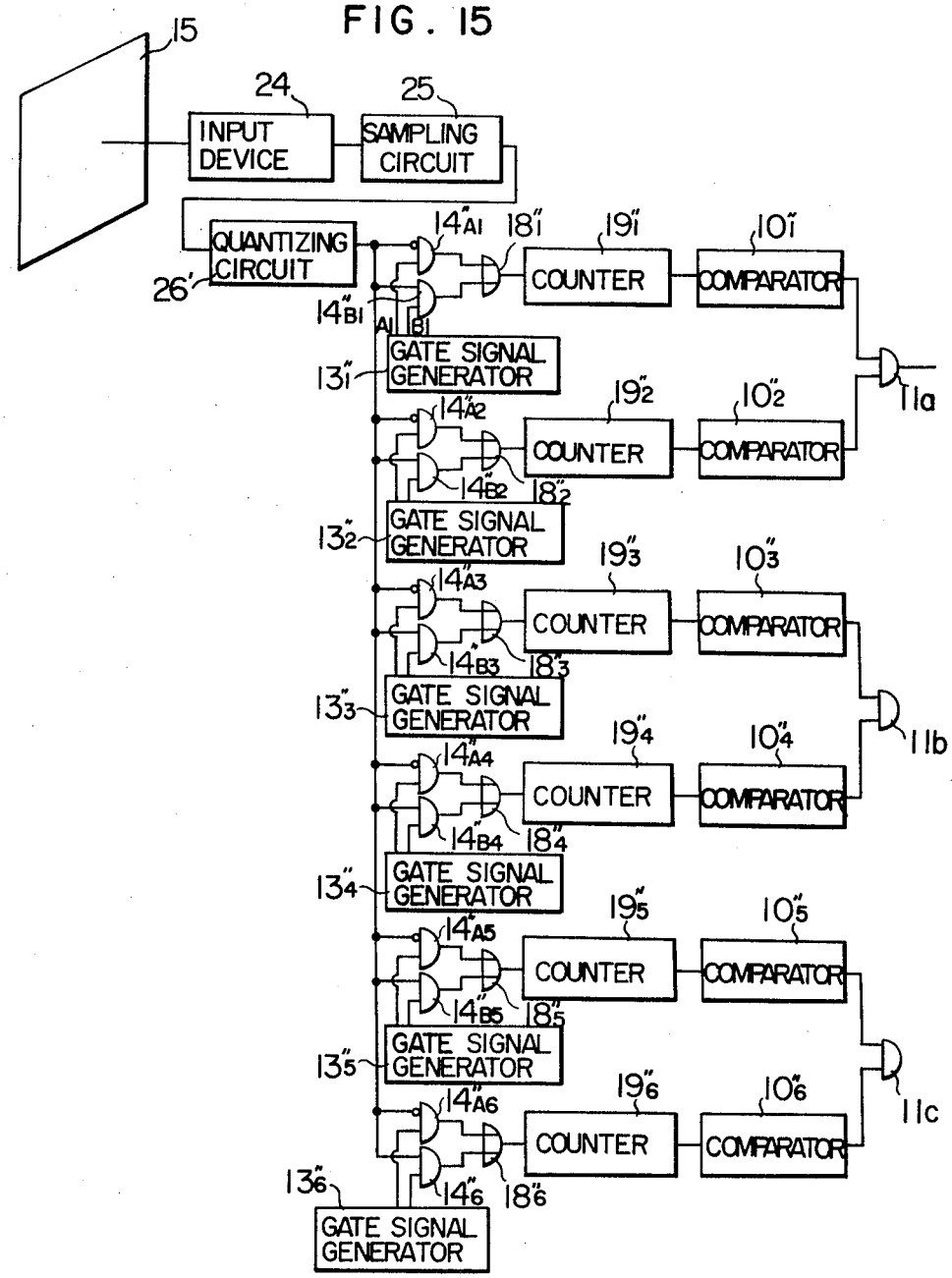
FIG. 15 is a further embodiment of the present invention.

FIG. 15 is an embodiment of the arrangement according to the present invention for discriminating the patterns of FIGS. 11a to 11c by the setting of FIGS. 16a to 16c. Reference numeral 26′ designates a quantizing circuit for putting the output of the sampling circuit 25, i.e. the pattern values of various parts of the object pattern 15 into either of the states 1 and 0. The signal from the hatched parts in FIGS. 11a to 11c is put into a binary 0, and the signal from the remaining parts is put into a binary 1. Reference numeral $13''_1$ designates a space gate signal generator for generating space gate signals $A_1$ and $B_1$, reference numeral $14''_{A1}$ designates an AND gate circuit to produce an output of a binary 1 when the signal $A_1$ of the space gate signal generator $13''_1$ is a binary 1 and the output of the quantizing circuit 26′ is a binary 0, reference numeral $14''_{B1}$ designates an AND gate circuit which produces a binary 1 when the signal $B_1$ of the space gate signal generator $13''_1$ is a binary 1 and the output of the quantizing circuit 26″ is a binary 1, and reference numerals $14''_{A2}$ and $14''_{B2}$ designate AND gate circuits performing the same operation as the AND circuits $14''_{A1}$ and $14''_{B1}$, respectively, except that the space gate signals are $A_2$ and $B_2$ signals. Reference numerals $18''_1$ and $18''_2$ designate OR gates.

Consequently, when the entire pattern space is scanned by the input voltage 24, a number of pulses (because spatially separated by the sampling circuit 25) proportional to the sum of the area of the part which is within the space region 100 or 102 and at which the state of the object pattern is 1 and the area which is within the space region 101 and at at which state of the object pattern is 0 are outputted by the OR gate circuit $18''_1$. Also, a number of pulses proportional to the sum of the area of the part which is within the sapce region 103 or 105 and at which the state of the object pattern is 1 and the area of the part which is within the sapce region 104 and at which the state of the object pattern is 0 are outputted by the OR gate circuit $18''_2$.

Reference numerals $19''_1$ and $19''_2$ designate counters for counting the numbers of pulses outputted by the OR gate circuits $18''_1$ and $18''_2$, respectively. Reference numerals $10''_1$ and $10''_2$ designate comparators which produce 1 when the contents of the counters $19''_1$ and $19''_2$ are lower than certain set values, otherwise produce 0, respectively. The comparators $10''_1$ and $10''_2$ are reset at the start of the scanning by the input device 24, and the counters $19''_1$ and $19''_2$ operate when the scanning by the input device 24 is performed over the entire pattern space.

Both of the space regions 101 and 104 in FIG. 16a are set to correspond to a part of the state 1 of the object pattern of FIG. 11a, and all of the space regions 100, 102, 103, and 105 are set to correspond to a part of the state 0 of the object pattern of FIG. 11a. Consequently, when the pattern of FIG. 11a is selected as the object pattern 15, the final counts of the counters $19''_1$ and $19''_2$ are both to be zero in principle, so that it is sufficient to select values approximating zero as the set values of the comparators $10''_1$ and $10''_2$. Actually, the count may not always be zero due to the deformation of the pattern. Consequently, a somewhat larger value may be selected as the set value to allow this situation. Then, when the pattern of FIG. 11a is selected as the object pattern 15, the output of both comparators $10''_1$ and $10''_2$ is a binary 1, so that the output of the AND gate circuit 11a is a binary 1.

When the pattern of FIG. 11b or 11c is selected as the object pattern 15, the output of the AND gate circuit 11a is a binary 0 because the counts of the counters $19''_1$ and $19''_2$ after the completion of respective field scanning are never values around zero simultaneously. That is, when set as above, the output of the gate circuit 11a can be regarded as the recognized signal of the pattern of FIG. 11a.

In FIG. 15, if the circuit blocks including the gate circuits 11b and 11c, respectively, are constructed similarly to the circuit block including the gate circuit 11a, the outputs of the gate circuits 11b and 11c are the recognized outputs of the patterns of FIGS. 11b and 11c, respectively. However, since the boundary between the regions 112 and 113 in FIG. 16c, for example, is not in complete agreement with the boundary line of the pattern of FIG. 11c, the final contents of the counters $19''_5$ and $19''_6$ are not zero but certain values even when the pattern of FIG. 11a is the object pattern. Since these values can be known beforehand from the pattern of FIG. 11c and the shape and size of the space regions of FIG. 16c, it is sufficient to make the comparators $10''_5$ and $10''_6$ such that they produce a binary 1 when the contents of the counters $19''_5$ and $19''_6$ approach these values, respectively.

The space regions 100, 101 and 102 in FIG. 16a happen to be the same as the space regions 106, 107 and 108 in FIG. 16b. In such a case, the circuit parts $13''_3$, $14''_{A3}$, $14''_{B3}$, $18''_3$ and $19''_3$ may be omitted and the output of the counter $19''_1$ may be supplied to the comparator $10''_3$. Further, if the comparison condition of the comparator $10''_1$ is in agreement with that of the comparator $10''_3$, the comparator $10''_3$ can of course be omitted so that the gate circuit 11b is supplied with the signal from the comparator $10''_1$ instead of from the comparator $10''_3$.

Figure 17A:
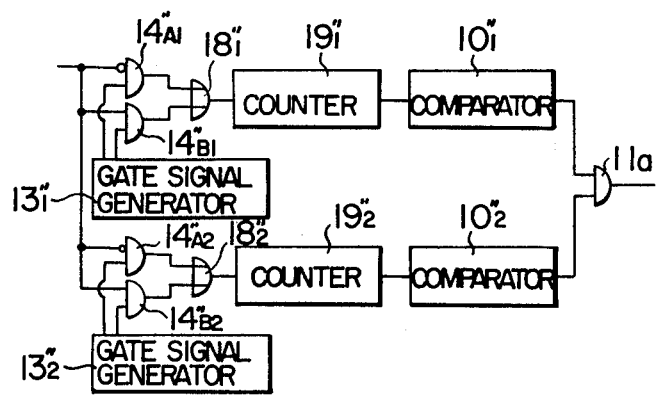
FIGS. 17a and 17b are modifications of a part of the embodiment of FIG. 15.
Figure 17B:
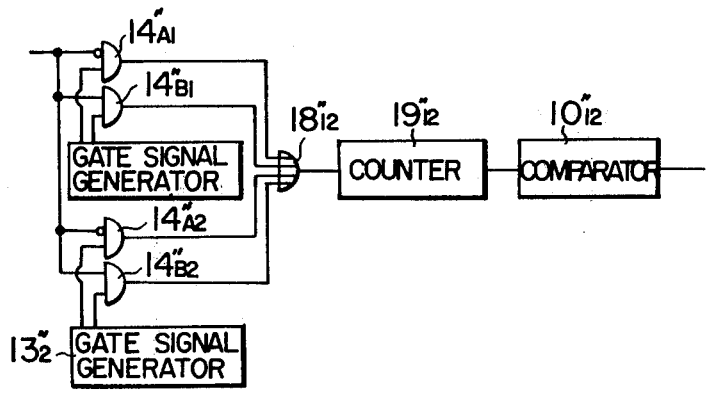

The circuit block including the gate circuit 11a in FIG. 15 which is again shown in FIG. 17a may be modified as shown in FIG. 17b. Strictly speaking, the operations of the circuits of FIGS. 17a and 17b are different from each other, but in some cases they attain the same purpose. In the arrangement of FIG. 17b, an OR gate $18''_{12}$ supplies a number of pulses (described above) proportional to the sum of the area of the parts at which the state of the object pattern in the space regions 100, 102, 103 and 105 is 1 and the area of the parts at which the state of the object pattern in the space regions 101 and 104 is 1 to the counter $19''_{12}$. The content of the counter $19''_{12}$ at the time of the completion of the field scanning is decided by the comparator $10''_{12}$. The setting value of the comparator $10''_{12}$ should be determined taking the possibility of the deformation of the object pattern into consideration. If the deformation is considered to occur uniformly throughout the pattern, it is good to select the setting value of the comparator $10''_{18}$ somewhat larger than the setting values of the comparators $10''_1$ and $10''_2$ and taking the characteristics, property, etc. of the object pattern into consideration. Then, the arrangement of FIG. 17b has the advantage that the number of the circuit parts is smaller than that of the arrangement of FIG. 17a.

As regards the number of the circuit parts, the space gate signal generators $13''_1$, $13''_2$, ...., $13''_6$ are not always necessary to be provided independently to individual circuit branches in FIG. 15, but in many cases the arrangement is simplified by replacing these space gate signal generators with a common space gate signal generator. Also, in the arrangement of FIG. 15 the recognition circuit blocks are provided individually for the three patterns, but it may be sufficient to provide only one circuit block which is to be used time sequentially by switching over the space gate signal and the setting value of the comparator, though the comparator, though the processing time is generally prolonged.

When the space gate signals of FIGS. 16a and 16b are utilized, recognition is possible even for some vertical positional variation of the object pattern. Consequently, provision of an effective industrial recognition apparatus is possible by making the most of these circumstances. When a body traveling carried by a belt conveyor is to be recognized as shown in FIG. 18 which will be described below, it is very advantageous to constructing apparatuses that some positional discrepancy in a direction lateral to the running direction is allowed. For example, when the space gate signal of FIG. 12b is used in place of that of FIG. 16b, a body or pattern shifted in a vertical direction cannot naturally recognized. If such a body or pattern is to be recognized, the field of the television image input device or the entire space region is shifted in a vertical direction and field scanning must be repeated in a number of times. However, if the space gate signal of FIG. 16a or 16b is utilized, these cumbersome procedures for recognition processing is unnecessary. Consequently, not only the apparatus is simplified, but also the processing speed is improved.

FIG. 18 shows an application of the arrangement of FIG. 10 to article selection or sorting. Articles travel in a horizontal direction and the selecting or recognizing operation is performed continuously. Illumination augments the brightness contrast between the articles and the background to enable the processing by two state signals.

In FIG. 18 reference numerals 34, 35, and 36 designate articles, reference numeral 37 designates a belt conveyor carrying the articles, reference numeral 38 designates a relatively bright plate which is luminant or illuminated, and reference numeral 24 designates a television image input device. When the articles 34, 35 and 36 are present in front of the image input device 24, images as shown in FIGS. 19a, 19b and 19c are inputted, respectively. Reference numeral 25 designates a sampling circuit (already described with reference to FIG. 10), and reference numeral 39 designates a quantizing circuit which is assumed to encode the white state of the image as shown in FIGS. 19a to 19c into a binary 1 and the black state into a binary 0. Reference numeral 13'' designates a space gate signal generator for generating the space gate signal of FIG. 12a and is assumed to output from its A output a signal which is a binary 1 at the part A in FIG. 12a and from its B output a signal which is a binary 1 at the part B in FIG. 12a. Reference numerals 14''$_A$ and 14''$_B$ designate AND circuits (small circle at the input indicates negation), and reference numeral 18'' designates an OR circuit. Since the AND gate 14''$_A$ outputs a signal which is a binary 1 when it is the part A in FIG. 12a and the image is white, and the AND gate 14''$_B$ outputs a signal which is a binary 1 when it is the part B in FIG. 12a and the image is black, the output of the OR gate 18'' is never a binary 1 when the image of FIG. 19a is inputted. Consequently, even at the stage the scanning of the entire image is completed, the count of the counter 19'' is zero in principle. In contrast, when an image other than that of FIG. 19a is inputted, the numerical value corresponding to the area of the part different from the image of FIG. 19a (strictly speaking, the part in FIG. 12a which is not A nor B is subtracted from this part) is counted by the counter 19''.

Actually, since it cannot be expected that the count of the counter 19'' is completely zero, even if the article 34 becomes an object, due to noise and the movement of the body, it is good to determine the reference standard of the counter 10'' by taking into consideration the count obtained when a body which is least different from the body 34 is shape is an object.

Reference numeral 40 designates a manipulator control section which controls a predetermined handling by the output of the comparator 10'', and reference numeral 41 designates the handling part thereof.

The arrangement of FIG. 18 is provided with three sets of the circuit parts 13'', 14''$_A$, 14''$_B$, 18'', 19'' and 10''. These three sets of circuit branches are set suitably for the images of FIGS. 19a to 19c and output the recognized outputs of the articles 34, 35 and 36, respectively.

In this arrangement, the recognized output of a body can be obtained at the field at the moment the body passes the part corresponding to the set space region. Consequently, by supplying this output signal to the manipulator control section 40 the handling or manipulating part 41 can perform operations suitable for individual bodies. For example, if the recognition output for the body 34 is supplied, the manipulator 41 catches and carriers the body 34 to a predetermined place; if the recognition output for the body 35 is supplied, the manipulator 41 pushes the body 35 down from the conveyor belt 37, and so on. Alternatively, if the kind of a body is memorized when the recognition output is produced and if the manipulator control section 40 is made such that it drives the manipulator 41 after a certain time, which is dependent on the speed of the conveyor, has elapsed from the time of the recognition output production, sorting and handling are possible at a place different from the recognizing position. Since such manipulator control section and manipulator are known, no further description will be made.

If an automatic machine having the visual information processing function is constructed in the above manner, it is possible to provide measures quite effective to manpower saving in the manufacturing process even if the configurations of the objects to be handling are complicated and the number of the kinds of the objects is many because handling suitable for each kind is possible.

By a general characteristic of visual information processing, recognition or detection of an object is possible without contacting thereto, and an automatic machine with a high flexibility with regard to the configuration of the object can be constructed. Moreover, since the setting up of the visual information processing section is easy as described above and the scale of the arrangement is small, the arrangement is inexpensive and a high speed processing is possible.

In the above embodiments, at least one specified region (space region) is provided, the pattern value to be taken by the region is predetermined, and the area of the part of the object pattern at which the object pattern takes the predetermined pattern value is measured. If the measured area is within a predetermined range, the object pattern is regarded as the pattern to be recognized.

In contrast, in the following embodiments, the area of the part of the object pattern at which the object pattern takes the pattern value opposite to the predetermined pattern value to be taken by the specified region is measured. If the measured area does not exceed a predetermined value (or is within the allowance), the object pattern is taken to be the pattern to be recognized.

Figure 20:
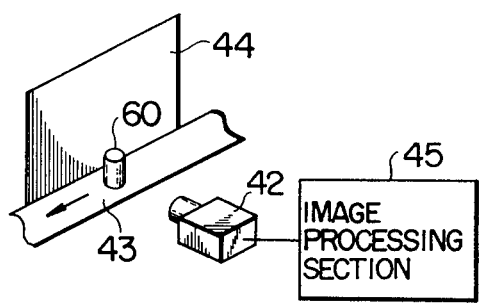

FIG. 20 shows an example of the arrangement for determining the position of a body travelling carried on a belt conveyor by the use of an ITV camera (industrial television camera) as the image input device. In this case, since the object to be recognized is travelling, the positional information is represented by the time at which the body passes the specified position. Reference numeral 60 designates a body to be recognized, reference numeral 42 designates an ITV camera, reference numeral 43 designates a belt conveyor, and reference numeral 44 designates an illuminator. The illuminator 44 is a bright plane light source, so that the body 60 travelling in front thereof will be catched or picked up by the ITV camera as a silhouette. Generally, it is sufficient that there is a difference in the luminance or brightness between the body and the background. One method thereof is to make the body a silhouette as above, and another is to make the body light and the background dark contrary thereto, for example. Of course, even in the case that the body is white and the background is grey and black, the quantizing can be made easily. In this case, the body is made 1 and the background is made 0, for example. It may be also that the body is grey and the background is white and black. Reference numeral 45 designates an image information processing section which produces a pulse signal at the time at which the body 60 passes the specified region of the field of the ITV camera 42. A detailed description will be made below.

Figure 21A:
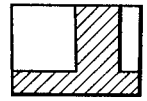
Figure 21B:
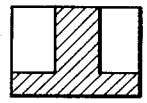

If it is assumed that the belt conveyor 43 travels in the direction of the arrow, the image of the body picked up by the ITV camera 42 is as shown in FIG. 21a at one time, and as shown in FIG. 21b at a later time. The hatched part is the black part of the object to be picked up and the remaining part is the white part thereof.

Figure 22:
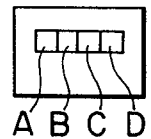

When there is such an image input, regions are established on the image plane as shown in FIG. 22. Such specified regions are named A, B, C and D. It is assumed for the sake of simplicity of description that the widths of the regions in the horizontal direction are equal to each other and that the sum of the widths of the regions B and C in the horizontal direction is in agreement with the width of the image of the body 60 in the horizontal direction.

Figure 23A:
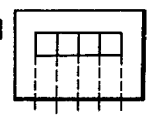
Figure 23B:
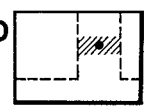
Figure 23C:
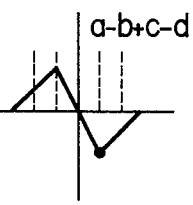

With respect to the regions A and D, the areas of the parts thereof at which the value of the image signal corresponds to black are measured, and with respect to the regions B and C, the areas of the parts thereof at which the value of the image signal corresponds to white are measured, and the measured areas are denoted by $a$, $d$, $b$ and $c$, respectively. If an arithmetic operation such as $S = a - b + c - d$, for example, is performed on these areas, it follows that $S = 0$ when the image of the body 60 is at the regions B and C. If the image of the body 60 is a little on the right-hand side relative to this position, it becomes $S < 0$, while it is a little on the left-hand side, it results in $S > 0$. A strict representation of this fact is shown in FIGS. 23a to 23c, in which FIG. 23a shows the specified regions A, B, C and D and FIG. 23b shows the image of the body 60. FIG. 23c shows the value of S which varies depending on the position of the center (denoted by a dot as an example) of the image of the body 60 in the horizontal direction. If it is assumed that the image of the body 60 travels from right to left, the time at which $S$ changes from negative to zero is the time at which the image of the body 60 passes the boundary between the regions B and C.

When an image is inputted by the ITV camera, in some cases, strictly speaking, $S$ does not become zero because the input of the image is performed every 1/30 sec. or 1/60 sec. so that the image travels intermittently. In such a case, it is sufficient that the time at which $S$ changes from negative to positive.

A practical circuit of the image information processing section 45 will be described referring to FIG. 24. Reference numeral 46 designates a circuit for quantizing circuit an image signal (luminance or brightness signal) which encodes a white image signal into the state 1 and a black image signal into the state 0. Reference numeral 47 designates a sampling circuit which produces an image discrete in the horizontal direction as well as in the vertical direction (an ITV camera produces an image discrete in the vertical direction due to it scanning system). The timing of the sampling is produced by a synchronizing signal generator 48. Reference numerals $49_A$, $49_B$, $49_C$ and $49_D$ designate gate circuits which open at the region A, B, C and D. The gate signals therefor are supplied by a space gate signal generator 50 from its terminals A, B, C and D. These gate signals can be easily produced by utilizing the timing signal for the horizontal sampling (which is equivalent to the horizontal synchronizing signal of an ITV camera). These apparatuses are as described with reference to the above embodiments.

Reference numerals $51_A$ to $51_D$ designate counters (generally, integrating elements) for obtaining the areas $a$, $b$, $c$ and $d$, respectively. Since the negation of a quantized image signal passes through the gate circuit $49_A$, for example, the counter $51_A$ counts the value proportional to the area at the time when the output of the quantizing circuit 46 is 0, i.e. the image is black (and at the area A). Similarly, the counters $51_B$, $51_C$ and $51_D$ count the values proportional to the areas at the time of the image being white, white, and black, respectively. These counters are reset at the start of the scanning by the ITV camera (equivalent to the vertical synchronizing signal).

Reference numerals 52, 52' and 52'' designate adders and subtracter which are operated in this state by the timing signal from the synchronizing signal generator 48. The adder 52 performs the addition of the counts of the counters $51_A$ and $51_B$, while the adder 52' performs the addition of the counts of the counters $51_B$ and $51_D$. The subtracter 52'' subtracts the output of the adder 52' from the output of the adder 52 to produce an output of $S = a - b + c - d$.

Reference numeral 53 designates a register for storing the output of the subtracter 52'' at the time of the right preceding image scanning. Reference numeral 54 designates a decision circuit which produces an output of 1 when the stored value of the register 53 is negative and the output of the subtractor 52'' is zero or positive. Since it is sufficient for the decision circuit 54 to output 1 if the most significant bit of the content of the register 53 is 1 and the most significant bit of the content of the subtractor 52'' is 0 when the contents of the register 53 and the subtractor 52'' are pure binary numbers, it can be easily fabricated with a NOT circuit and an AND circuit. After the completion of the operation of the decision circuit 54, the output of the subtractor 52'' is stored in the register 53.

In this manner, the pass timing output relating to the position of a body as described above can be provided. The timing and sequence of the operation in the above description are all controlled by the synchronizing signal generator 48 though a detailed description is omitted. Also the scanning of the ITV camera is controlled by the signal from the synchronizing signal generator 48.

Figure 24:
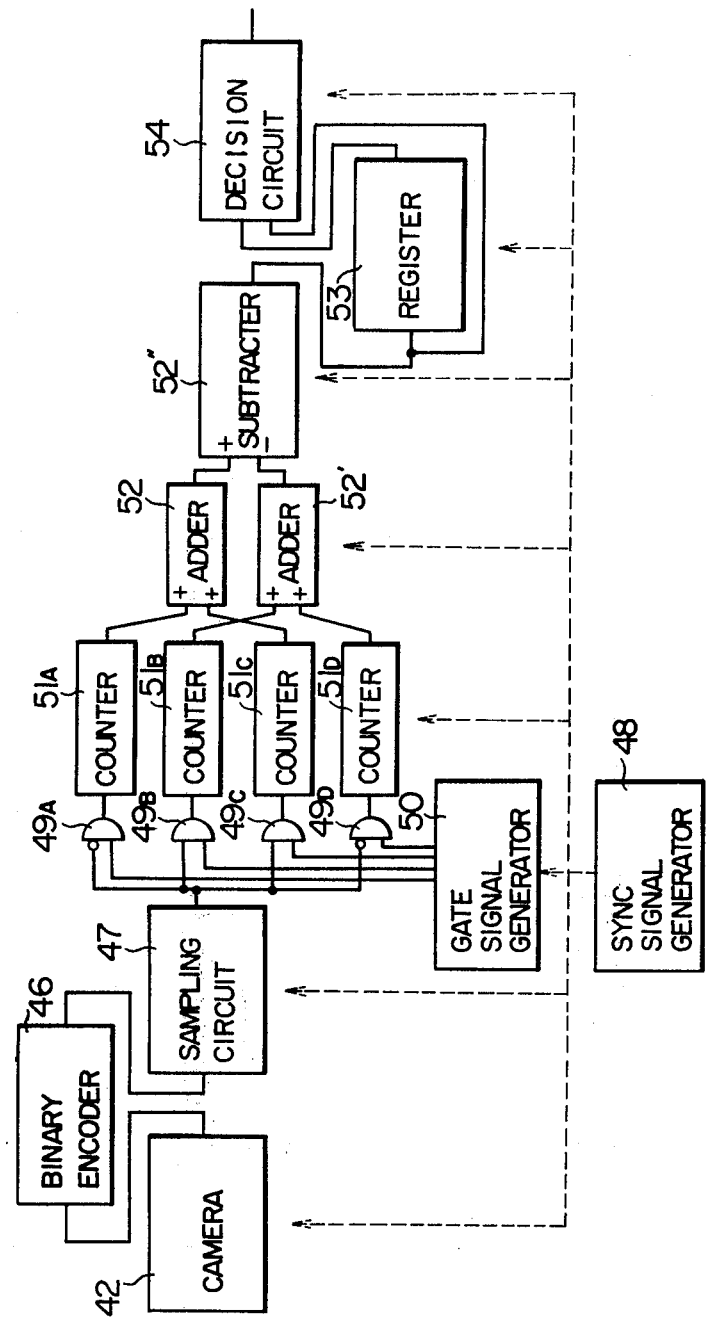

The arrangement of FIG. 25 is a simplification of the arrangement of FIG. 24 by replacing the counters $51_A$ to $51_B$ with an up-down counter 55. The sign "+" in the up-down counter 55 indicates the input terminal for adding the input pulse and the sign "−" indicates the input terminal for subtracting the input pulse. The operations of the circuits parts 46, 47 48, $49_A$ to $49_D$, 50, 53 and 54 are all the same as those in FIG. 24. Reference numerals 56 and 56' designate OR gates. The OR gate 56 makes the outputs of the AND gates $49_A$ and $49_C$ pass therethrough to supply them to the + terminal of the up-down counter 55, while the OR gate 56' makes the outputs of the AND gates $49_B$ and $49_D$ pass therethrough to supply them to the − terminal of the counter 55. Since the regions A, B, C and D are independent of each other, the content of the counter 55 is a $a - b + c - d$, i.e. S at least at the end of the image scanning of the ITV camera.

Although in the above two examples the image signal (luminance signal) is treated as binary values, this is not always a necessary condition. For example, when the brightness or luminance of the image of the object pattern 60 is 20 to 30 % (black is assumed to be 0 %, and white is assumed to be 100 %) and the luminance of the background, for example the illuminator 44, is 90 to 95 %, 20 to 30 % may be made the measuring condition of the areas $a$ and $d$ and 90 to 95 % may be made the measuring condition of the areas $b$ and $c$. This situation can be realized easily by providing a plurality of quantizing circuit of different values.

According to the characteristics of image noise (including stains on the body and the background and variation in the shape in addition to electrical noise) 0 to 90 % and 95 to 100 % may be made the measuring conditions of the areas $a$ and $d$ and 0 to 20 % and 30 to 100 % may be made the measuring conditions of the areas $b$ and $d$, or the conditions of the preceding example and this example may be combined.

Although, here, for the regions A and D the luminance of the image of the body 60 was made the condition of obtaining the areas $a$ and $d$ and for the regions A and C the luminance of the image of the background of the body 60 was made the condition of obtaining the areas $b$ and $c$ (or these are modified), it may be that to the contrary the condition concerning the luminance of the image of the background of the body 60 is given to the regions A and D the condition concerning the luminance of the image of the body 60 is given to the regions B and C.

In the above example the background was made bright and the silhouette of the body was made an image input. However, the body may be made bright and the background may be made dark.

Also, the sum of the widths of the regions B and C in the horizontal direction was made to agree with the width of the image of the body 60. However, this also is not a necessary condition. Further, the widths of the regions A, B, C and D in the horizontal direction were all made equal to each other. However, this also is not a necessary condition.

Here, the reason why the four regions A, B, C and D were provided in the above example will be described. Actually, the four regions are not necessarily needed for measuring the center of a part of the image of luminance, but it is sufficient with two regions B and C, for example. By treating $S = -b + c$ in the same manner as above for the two regions, the position (of the center) can be known. However, with only the two regions B and C the size of the part, of which the center has been known, cannot be known.

Figure 26A:
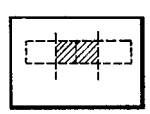
Figure 26B:
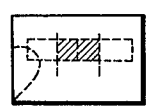

This matter will be described in some detail. Though it may be considered that the size of that part can be known by the sum $S$ of the areas $b$ and $c$, it is apparent that this leads to an erroneous decision due to the existence of the above-mentioned noise in the image. For example, for the image of FIG. 26$a$ the size of the part corresponding to the body can be known by $S$. However, for the image of FIG. 26$b$, $S$ does not represent the size of the part of the body. In such a case, the widths of the two regions B and C are made equal to the width of the body part and the widths of the regions A and D are individually made narrower. Then, whether or not the image of a (seeming) body in the visual field is in agreement with the set region can be decided by $S = a + b + c + d$, for example, and whether or not that image is passing the center (exactly, the middle between the boundary between the regions A and B and the boundary between the regions C and D) of the set region can be decided by $S = a - b + c - d$. Here, in case the agreement is decided by S, there results $S = 0$ when the sum of the widths of the regions B and C is in complete agreement with the width of the image of the body, but it is good to make $S < \epsilon$ ($\epsilon$ is the tolerance) the decision condition by taking image noise and an allowable degree of variation in the width of the image of the body into consideration.

Further, if it is established that whether $S < \epsilon$ is satisfied or not is decided when S varies from negative to positive or zero, the decision of the width of (a part of) the image of the body and the decision of the position (or time) at which that part is passing can be made simultaneously.

By providing a plurality of sets of such regions A, B, C and D and by performing a logical operation of the result of decision on each set, a more complicated configuration can be recognized with higher likelihood.

What we claim is:

1. In a pattern recognition apparatus for determining at least one of the shape and position of an object to be recognized comprising means for scanning objects to obtain video signals representing the shape of the objects, means for quantizing and sampling said video signals to provide output signals in accordance therewith, and means for processing the output signals to detect at least one of whether an object has a specified shape, and the position of the object, the improvement wherein said processing means comprises:

means connected to said quantizing and sampling means for generating four specified regions arranged in one direction, means connected to said generating means for measuring an area, where the output signal has a preassigned value, within each of said four specified regions, means for performing one arithmetic operation ($a-b+c-d$) between said measured areas of said four specified regions, where $a$, $b$, $c$, and $d$ are said measured areas of said four individual specified regions, and means for determining the position of the object from the sign change of the result of the one arithmetic operation.

2. A pattern recognition apparatus according to claim 1, further comprising means for performing another arithmetic operation ($a+b+c+d$) between said measured areas of said four specified regions, and means for determining whether the result of the another arithmetic operation is less than a predetermined threshold value corresponding to the shape of the object to be recognized.

3. A pattern recognition apparatus according to claim 2, in which said one and another arithmetic operations are simultaneously performed by an up-down counter.

4. A pattern recognition apparatus comprising first means for inputting an image of an object, second means for measuring an image area, at which the image signal has a value within a specified range, within each of four specified regions arranged in one direction, third means for performing successively first and second arithmetic operations between measured areas of the four specified regions, fourth means for determining whether the image area resulting from the first arithmetic operation is within a predetermined range corresponding to the shape of the object to be recognized, and fifth means for determining the position of said object from the time variation in the result of the second arithmetic operation, wherein the first arithmetic operation is $a+b+c+d$, and the second arithmetic operation is $a - b + c - d$, where $a$, $b$, $c$ and $d$ are the measured areas of the four individual specified regions.

* * * * *